United States Patent
Yamaguchi

[19]

[11] Patent Number: 5,875,358
[45] Date of Patent: Feb. 23, 1999

[54] METHOD AND APPARATUS FOR INSPECTING LENS-FITTED PHOTO FILM UNIT

[75] Inventor: Yukihiko Yamaguchi, Kanagawa, Japan

[73] Assignee: Fuji Photo Film Co., Ltd., Kanagawa, Japan

[21] Appl. No.: 975,485

[22] Filed: Nov. 20, 1997

[30] Foreign Application Priority Data

Nov. 28, 1996 [JP] Japan ................................. 8-318008

[51] Int. Cl.$^6$ ................................................. G03B 17/02
[52] U.S. Cl. .......................................................... 396/6
[58] Field of Search .............................. 396/6, 388, 401, 396/429, 502

[56] References Cited

U.S. PATENT DOCUMENTS

| | | | |
|---|---|---|---|
| 5,721,960 | 2/1998 | Zander et al. | 396/6 |
| 5,754,892 | 5/1998 | Yuito et al. | 396/6 |

*Primary Examiner*—Howard B. Blankenship
*Attorney, Agent, or Firm*—Sughrue, Mion, Zinn, Macpeak & Seas, PLLC

[57] ABSTRACT

A lens-fitted photo film unit is pre-loaded with unexposed photo film, and includes a taking lens. A shutter device is disposed between the taking lens and the photo film, and cocked in response to a winding operation of the photo film. The shutter device has a shutter blade for opening/closing a photographic light path in response to an external releasing operation. A flash device has a flash emitter window, and emits flash light in response to operation of the shutter device. Before inspection of the lens-fitted photo film unit, a front of the flash emitter window or a periphery of a front of the light path is covered by use of a light-shielding member. The light-shielding member avoids entry of flash light emitted from the flash emitter window into the light path. The flash device is charged. The shutter mechanism is cocked. The shutter mechanism is released while the light-shielding member covers the front. An operation of opening/closing of the shutter mechanism is inspected in response to the releasing operation. An operation of flash emission of the flash device is inspected.

9 Claims, 14 Drawing Sheets

F I G. 1
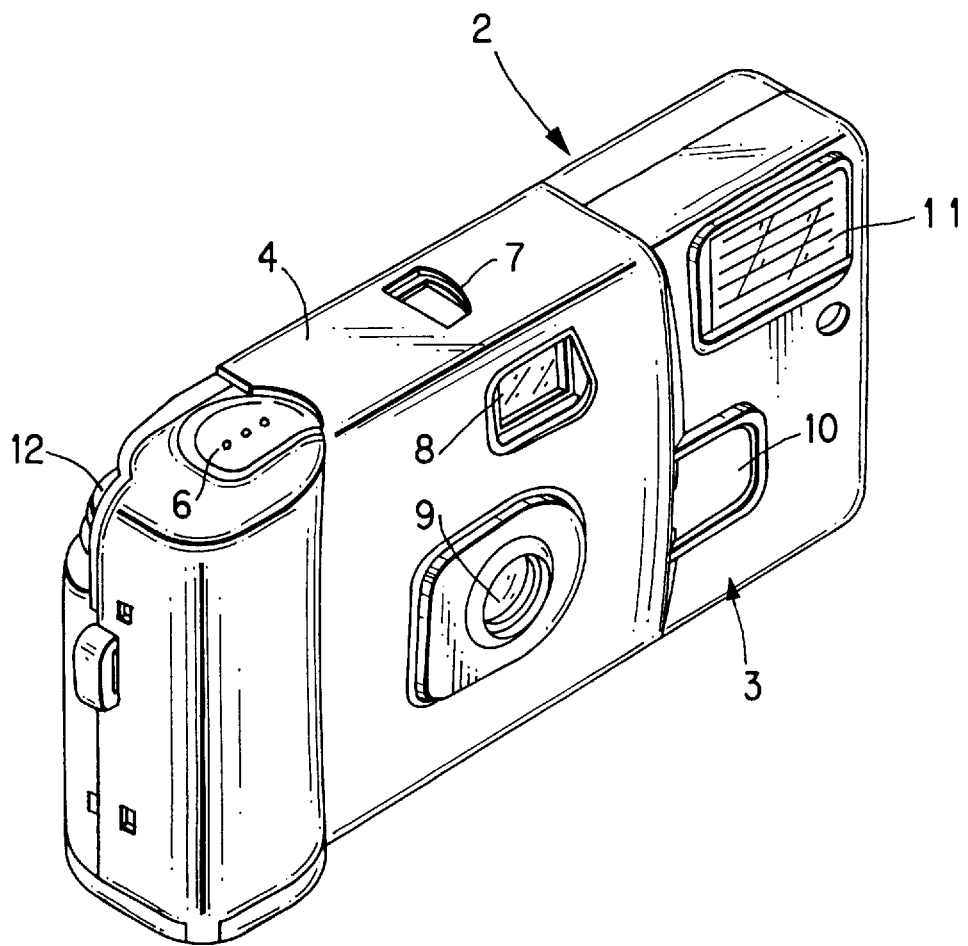

F I G. 7
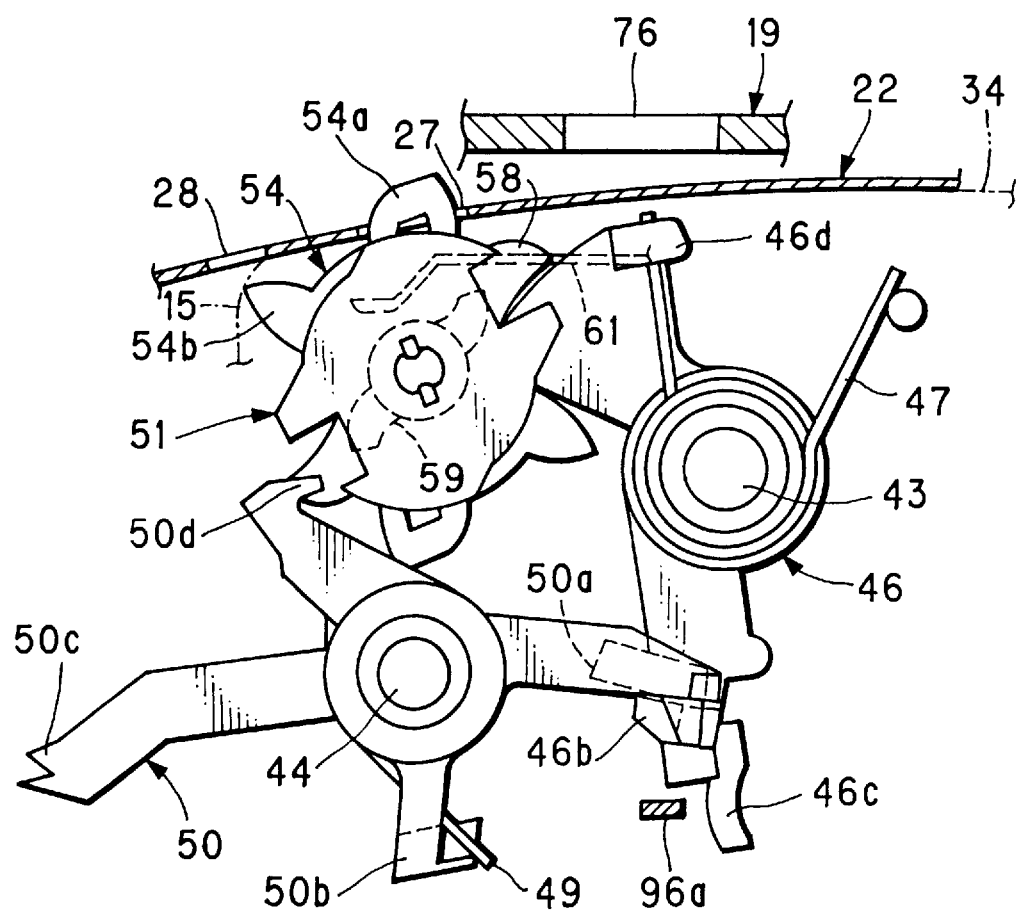

F I G. 12A
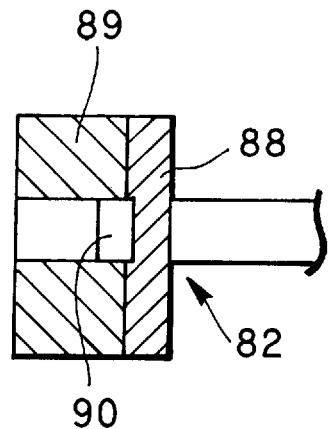
F I G. 13A
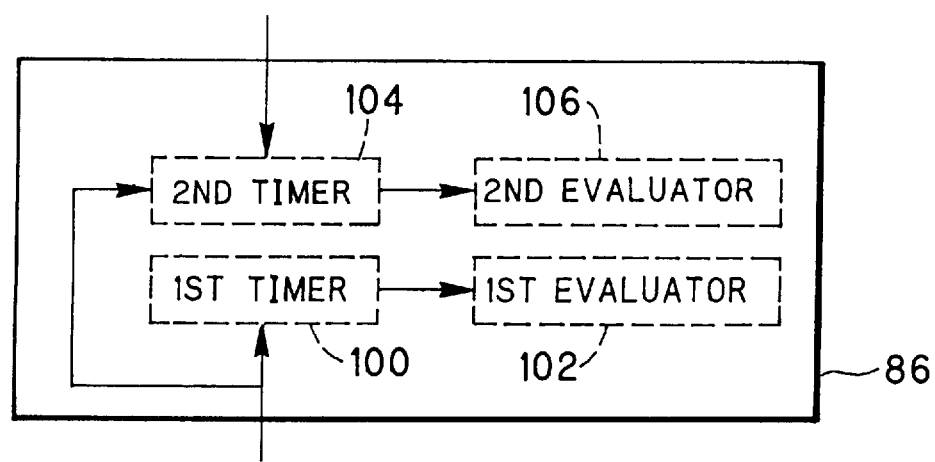

F I G. 13
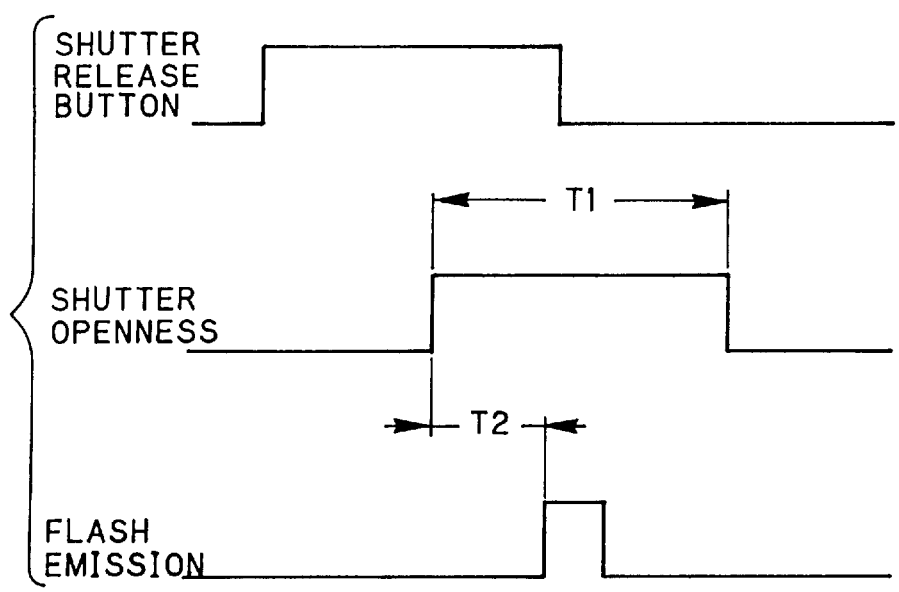

METHOD AND APPARATUS FOR INSPECTING LENS-FITTED PHOTO FILM UNIT

BACKGROUND OF THE INVENTION

1. Field of the Invention

The present invention relates to a method and an apparatus for inspecting a lens-fitted photo film unit. More particularly, the present invention relates to a method and an apparatus for inspecting a lens-fitted photo film unit incorporating an electronic flash device.

2. Description Related to the Prior Art

There is a lens-fitted photo film unit pre-loaded with photo film and incorporating a simple structure for taking exposures. In the lens-fitted photo film unit, the photo film is wound each time after one frame is exposed. The movement of the photo film in the winding operation is utilized for cocking a shutter mechanism, a one-frame advancement of the photo film and a rotation of a counter wheel by one step. The lens-fitted photo film unit incorporates an electronic flash device which emanates flash light in response to a releasing operation of the shutter mechanism, so that a photograph can be taken easily even indoors or at night.

The prevalent types of the lens-fitted photo film unit are pre-loaded with a photo film cassette of the 135 type. Also there is a type of lens-fitted photo film unit pre-loaded with the photo film cassette of the IX240 type. In the photo film cassette of the IX240 type, the photo film has a train of perforations arranged therein. The photo film cassette includes a plastic cassette shell for containing a roll of the photo film.

The photo film includes an effective exposure region and ineffective regions defined different from the effective exposure region. The effective exposure region is adapted to taking exposures in the lens-fitted photo film unit or a camera. The ineffective regions are determined as areas where exposures are inhibited. The perforations are arranged along an edge only of the effective exposure region of the photo film. The perforations are alternately arranged with two intervals being longer and shorter which are alternately repeated. One frame is exposed inside each of sections having the longer interval. Sections having the shorter interval are associated with intervals between the adjacent frames. The photo film for the photo film cassette does not have extra frames, but has the number of available frames determined for the photo film. The ineffective regions are used for development, and wound back into the cassette shell.

In a manufacturing process of the lens-fitted photo film unit, performance of the shutter mechanism is inspected after loading of the photo film together with inspection of winding the photo film. For example, a shutter speed of the shutter mechanism is measured and evaluated for the inspection of the shutter mechanism.

For the lens-fitted photo film unit with the flash device, it is conventionally general to inspect the shutter mechanism in a manner separate from inspection of the flash device. This is because a photo sensor of a reflection type for detecting movement of a shutter blade should be prevented from being affected by flash light of the flash device, and also because the ineffective region should be kept from being exposed by the flash light. However the inspecting manner of the shutter mechanism separate from the inspection of the flash device takes long time, is conspicuously slow in the manufacturing process, and is inconsistent to improvement of efficiency.

SUMMARY OF THE INVENTION

In view of the foregoing problems, an object of the present invention is to provide a method and an apparatus for inspecting a lens-fitted photo film unit, with efficiency heightened by simultaneously inspecting the shutter mechanism and the flash device.

In order to achieve the above and other objects and advantages of this invention, a front of a flash emitter window or a periphery of a front of a photograph-taking light path is covered by use of a light-shielding member, the light-shielding member being adapted to avoiding entry of flash light emitted from the flash emitter window into the light path. The flash device is charged. The shutter mechanism is cocked. The shutter mechanism is released while the light-shielding member covers the front. An operation of opening/closing of the shutter mechanism is inspected in response to the releasing operation. An operation of flash emission of the flash device is inspected.

In a preferred embodiment, the step of inspecting the shutter device includes steps of detecting existence of the shutter blade in the light path by use of a blade sensor through the taking lens, the blade sensor being shielded from the flash light by the light-shielding member. Acceptability of the opening/closing operation of the shutter device is evaluated in accordance with a signal from the blade sensor.

The step of inspecting the flash device includes a step of evaluating acceptability of the flash emission operation of the flash device in accordance with the signal from the blade sensor and a signal from the flash light sensor.

A shutter-open time is measured in response to the signal from the blade sensor, the shutter-open time being defined to begin upon retraction of the shutter blade from the light path and to end upon return of the shutter blade into the light path. The shutter-open time is evaluated with reference to a first predetermined range, and if the shutter-open time is detected within the first predetermined range, the shutter device being regarded as acceptable.

An elapsed time is measured in response to the signal from the blade sensor and the signal from the flash light sensor, the elapsed time being defined to begin upon the retraction of the shutter blade from the light path and to end upon the flash emission of the flash device. The elapsed time is evaluated with reference to a second predetermined range, and if the elapsed time is detected within the second predetermined range, the flash device being regarded as acceptable.

In accordance with the present invention, the shutter mechanism and the flash device can be simultaneously inspecting so that efficiency in manufacturing the lens-fitted photo film unit is heightened.

BRIEF DESCRIPTION OF THE DRAWINGS

The above objects and advantages of the present invention will become more apparent from the following detailed description when read in connection with the accompanying drawings, in which:

FIG. 1 is a perspective illustrating a lens-fitted photo film unit;

FIG. 7 is a plan illustrating the shutter mechanism in a released state;

FIG. 12A is a cross section illustrating a flash inspector unit of the inspecting apparatus;

FIG. 13 is a timing chart illustrating timing of the release of the shutter and the flash emission; and FIG. 13A is a block diagram illustrating functions of a microcomputer for the inspecting sequence.

DETAILED DESCRIPTION OF THE PREFERRED EMBODIMENTS OF THE PRESENT INVENTION

Figure 2:
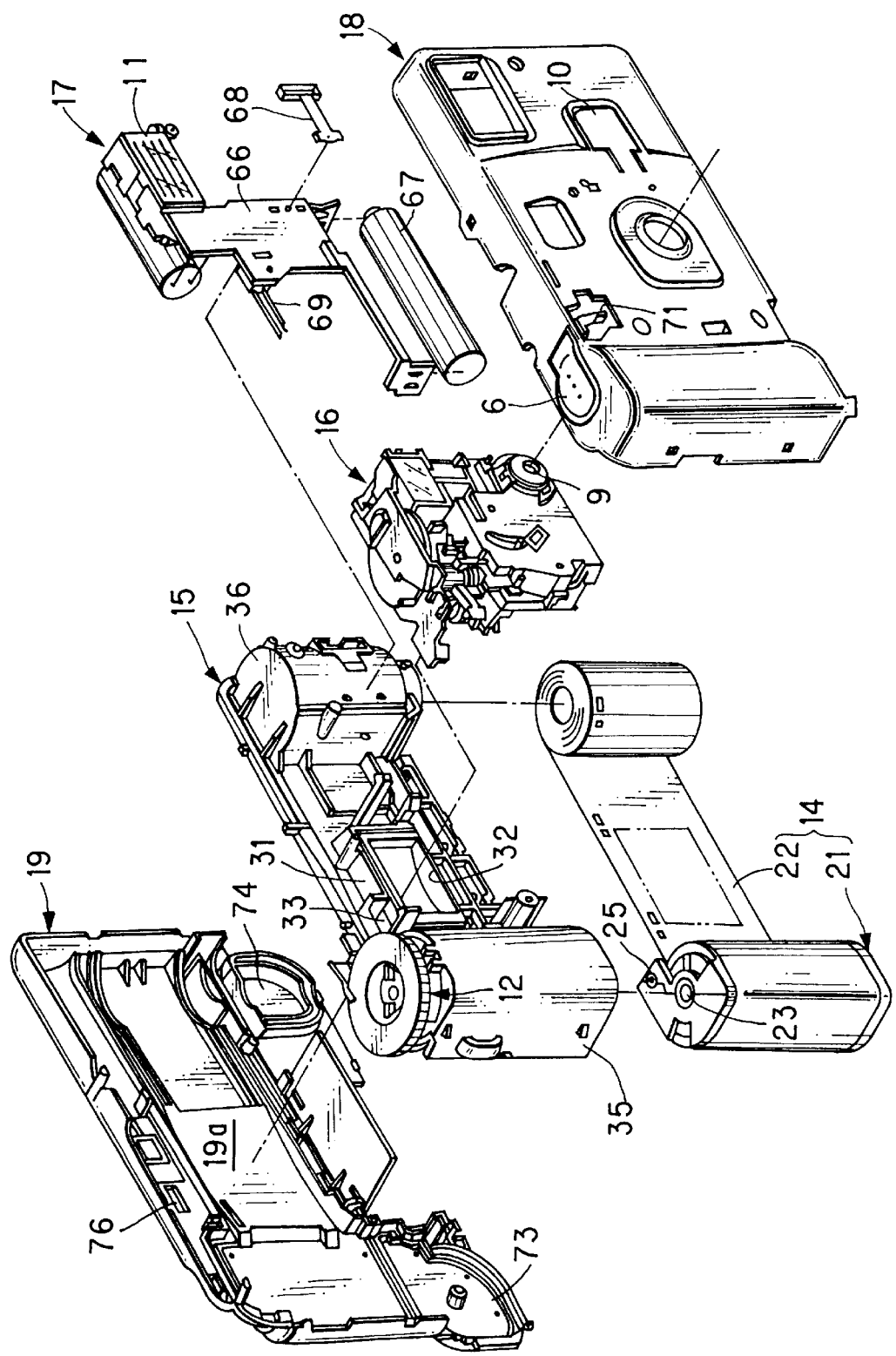
FIG. 2 is an exploded perspective illustrating the lens-fitted photo film unit.

In FIG. 1, a lens-fitted photo film unit 2 is constituted by a photo film housing 3 and an outer sheet member 4 of cardboard partially covering the housing 3. The housing 3 is pre-loaded with a photo film cassette, and includes structures for taking exposures.

A top of the housing 3 has a shutter release button 6 and a counter window 7. A front of the housing 3 has a viewfinder 8, a taking lens 9, a flash charge button 10 and a flash emitting window 11. There is a photo film winder wheel 12, which appears in a rear of the housing 3 in an operable manner for rotation each time after taking an exposure. A back surface of the outer sheet member 4 is coated with adhesive agent, to attach the outer sheet member 4 to cover the center of the housing 3 and portions about the shutter release button 6. The outer sheet member 4 has openings in which there appears the center of the shutter release button 6, the taking lens 9, the viewfinder 8, the counter window 7 and the like.

In FIG. 2, the housing 3 is constituted by a photo film containing unit 15 or main body, an exposure unit 16, an electronic flash device 17, a front cover 18, and a rear cover 19. The photo film containing unit 15 is loaded with a photo film cassette 14. The exposure unit 16 and the flash device 17 are secured to the front of the photo film containing unit 15. The front cover 18 covers the front of the photo film containing unit 15. The rear cover 19 covers the rear of the photo film containing unit 15. All those are assembled and secured by use of engagement of hooks.

The photo film cassette 14 is constituted by a cassette shell 21 and a photo film 22 contained in the cassette shell 22. The cassette shell 21 is formed from resin. A spool 23 is contained in the cassette shell 21 in a rotatable manner. A trailer of the photo film 22 is retained on the spool 23. Also the cassette shell 21 incorporates a mechanism for advancing a leader of the photo film 22 externally upon rotation of the spool 23. A cassette shutter rod 25 is contained in a photo film passageway (not shown) through which the photo film 22 is passed into and out of the cassette shell 21. The cassette shutter rod 25 is externally rotated to open/close the photo film passageway.

Figure 3:
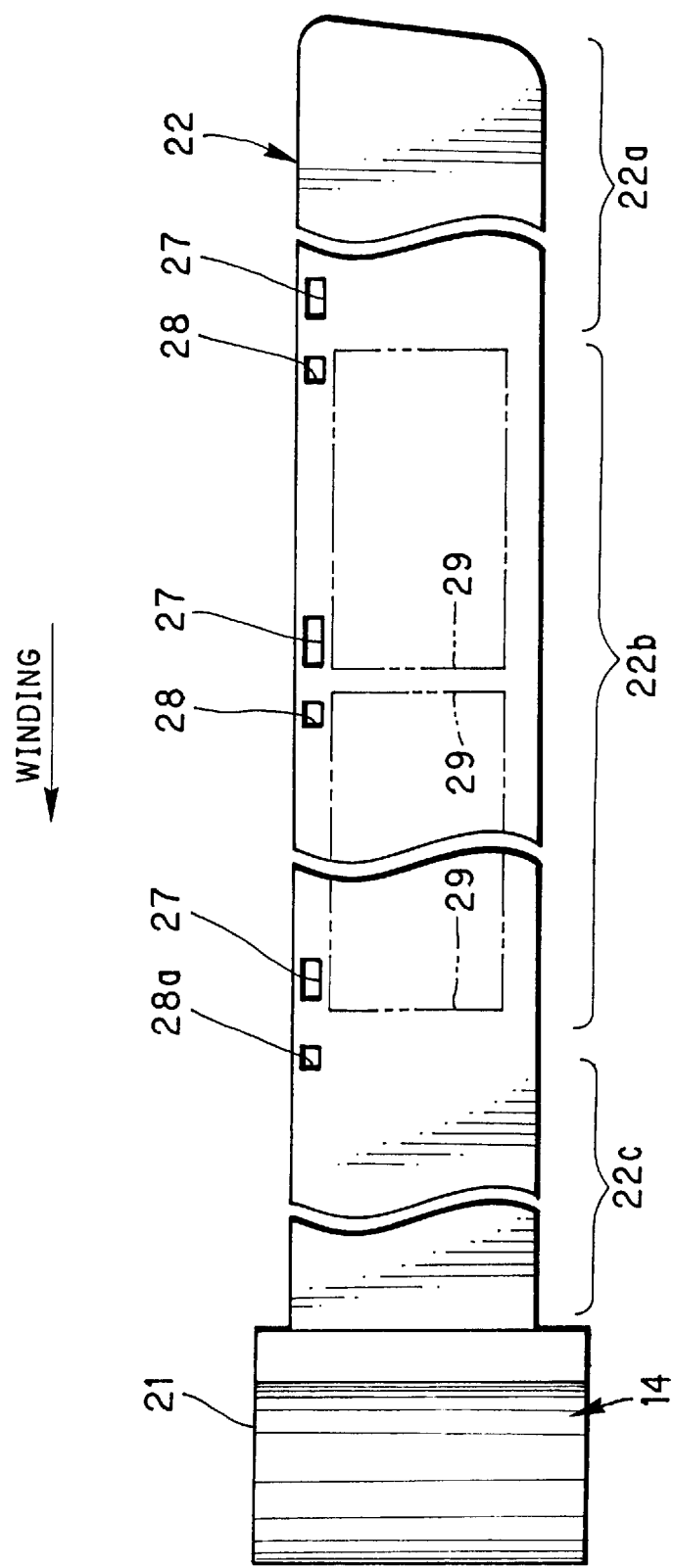
FIG. 3 is a front elevation illustrating a photo film cassette.

In FIG. 3, the photo film 22 includes a leader 22a, an effective region 22b and a trailer 22c. In the effective region 22b, there are perforations 27 and 28 arranged along one lateral edge of the photo film 22. The great perforations 27 are relatively great. The small perforations 28 are smaller. The perforations 27 and 28 are arranged regularly in an alternate manner and at two intervals repeated alternately. Each of frames 29 is formed in a range of which beginning and ending positions are defined by one of the great perforations 27 and one of the small perforations 28. In the lens-fitted photo film unit 2, the photo film 22 is wound into the cassette shell 21 each time of taking an exposure. Consequently the beginning position of the one of the frames 29 is defined by one of the great perforations 27 as viewed in a direction of moving the photo film 22. The ending position of the one of the frames 29 is defined by one of the small perforations 28. The number of pairs of the perforations 27 and 28 is set equal to the number of the frames 29.

An end of the trailer 22c is retained on the spool 23. An axial end of the spool 23 is engaged with the winder wheel 12. When the winder wheel 12 is operated to rotate the spool 23, the photo film 22 is wound about the spool 23. The leader 22a and the trailer 22c are regions unavailable for exposures, but will be utilized in a developing step. All the photo film 22 including the leader 22a and the trailer 22c are pre-wound into the cassette shell 21 when unexposed.

The photo film 22 is shaped by additionally working photo film adapted for use in an ordinary camera. The photo film 22 is distinct from the photo film for ordinary cameras for the reasons of the size of the great perforations 27 and existence of a small perforation 28a for initial cocking. The small perforation 28a is added in a range of the trailer 22c. In the photo film for ordinary cameras, there are one-size perforations including the small perforations 28 and such as would be defined by shortening the great perforations 27. The same photo film has no perforation 28a along the edge of the trailer 22c.

In the center of the photo film containing unit 15, a light-shielding tunnel 31 is formed. The light-shielding tunnel 31 operates to cover a photographic light path between the exposure unit 16 and the photo film 22. In the rear of the light-shielding tunnel 31 is formed an exposure aperture, which defines an exposure region to the photo film 22. Film rails 34 in FIG. 5 contact edges of the photo film 22 to guide it. In the front of the light-shielding tunnel 31, an opening 32 is formed to introduce a photographic object light from the taking lens 9 to the exposure aperture. In an upper position of the light-shielding tunnel 31, a wheel slot 33 is formed for causing a sprocket wheel in the exposure unit 16 to lie in contact with the photo film 22.

There are a cassette containing chamber 35 and a roll containing chamber 36 between which the light-shielding tunnel 31 lies. The cassette containing chamber 35 pre-contains the cassette shell 21. The roll containing chamber 36 pre-contains a photo film roll 35 in which the photo film 22 is wound. On the top of the cassette containing chamber 35, the winder wheel 12 is mounted in a rotatable manner. A drive shaft is formed on a bottom of the winder wheel 12, and is engaged with the spool 23 of the cassette shell 21. After each one exposure is taken, the winder wheel 12 is rotated in a counterclockwise direction in the drawing, to cause the spool 23 to wind the photo film 22, so that the photo film 22 is contained into the cassette shell 21.

Figure 4:
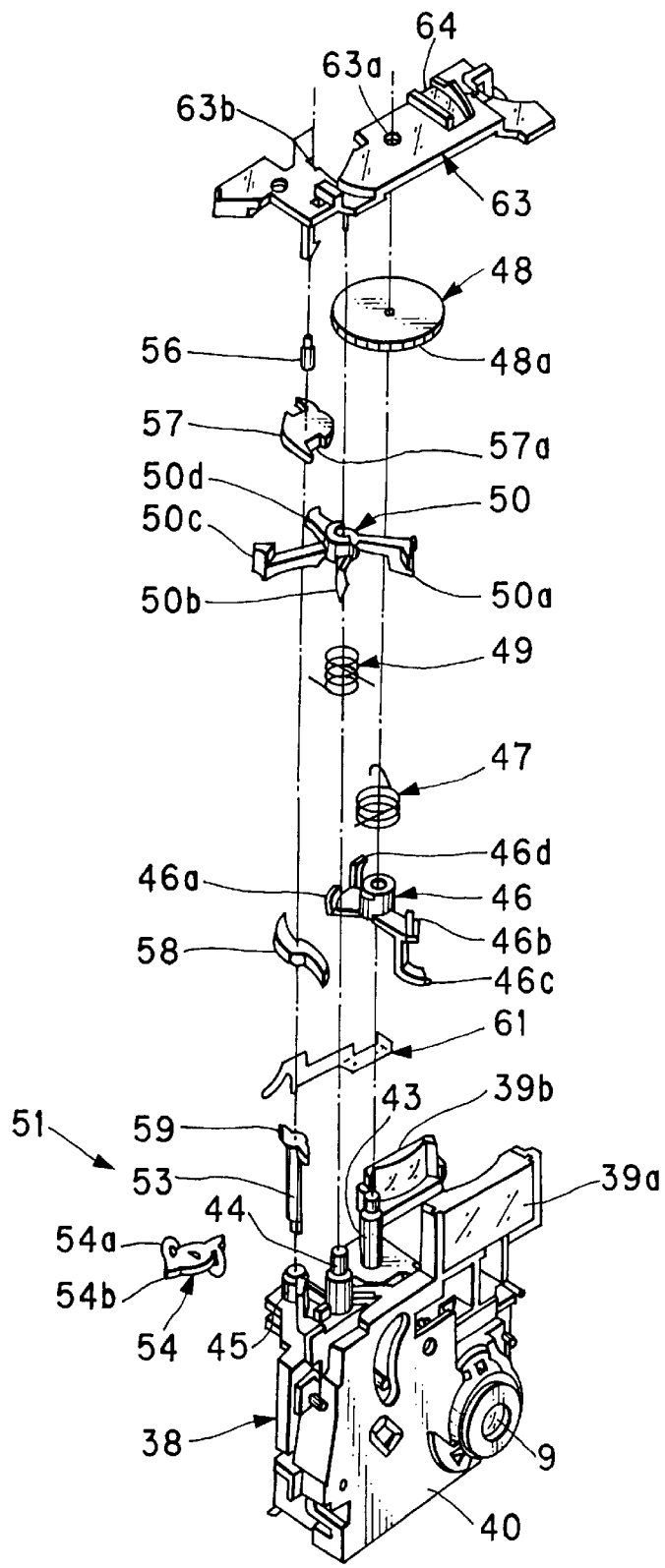
FIG. 4 is an exploded perspective illustrating an exposure unit.

In FIG. 4, the exposure unit 16 in relation to the present invention includes a base portion 38, which is a resinous part and to which various parts are secured by way of a single unit. The exposure unit 16 is secured to the front of the light-shielding tunnel 31 in a detachable manner. Those parts include a shutter mechanism, a one-frame advance mechanism, a frame counter mechanism and the like. An objective lens 39a and an eyepiece lens 39b, combined as a finder lens, are supported on the top of the base portion 38 to constitute the viewfinder 8.

Figure 5:
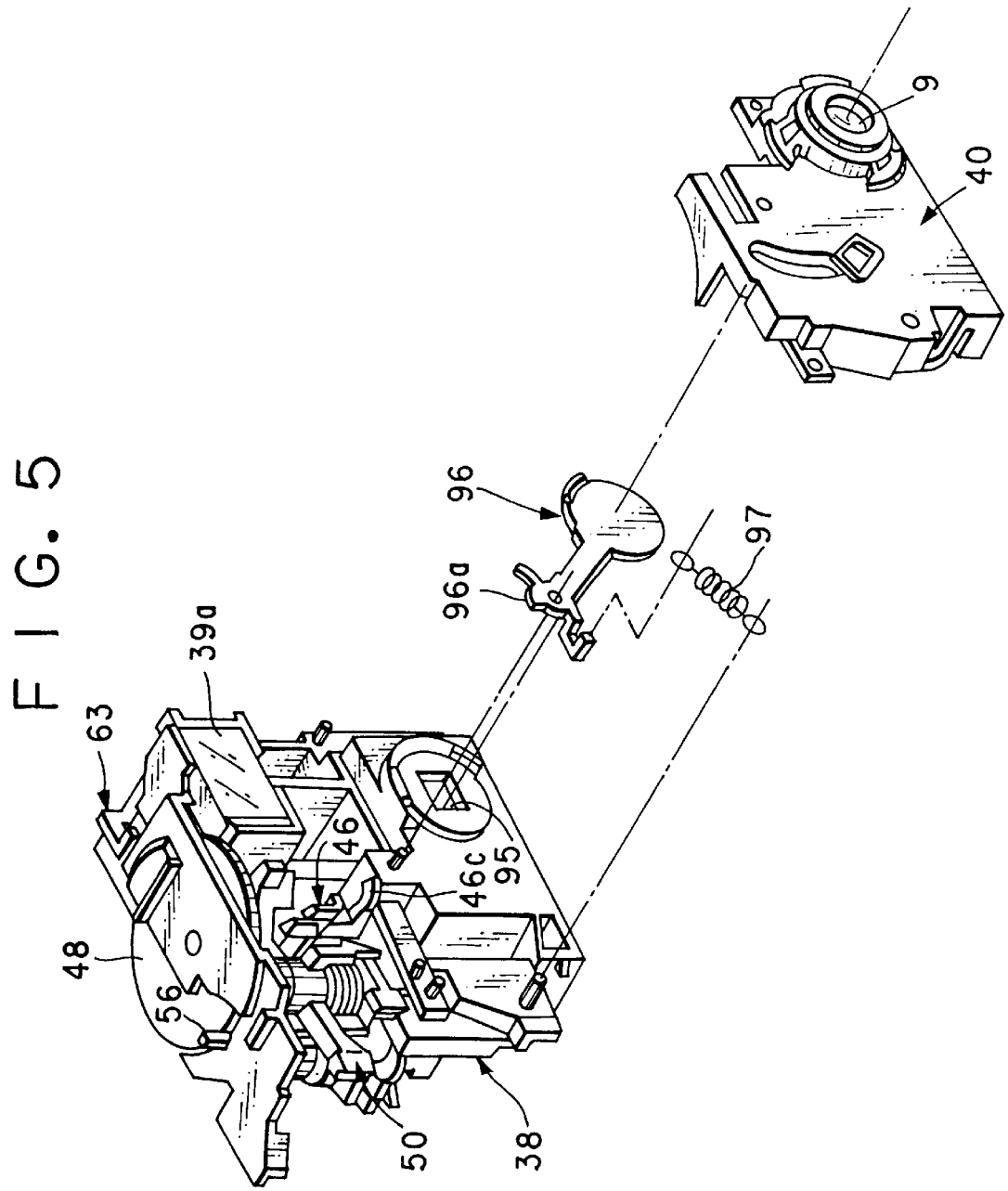
FIG. 5 is an exploded perspective illustrating a shutter blade with the exposure unit incorporating it.

In FIG. 5, a lens cover 40 is secured to the front of the base portion 38, and retains the taking lens 9. A shutter opening 95 is formed in the front of the base portion 38 for passing the object light. A shutter blade 96 is disposed at the shutter opening 95 in a swingable manner between the base portion 38 and the lens cover 40 to open/close the shutter opening 95. A return spring 97 biases the shutter blade 96 in a direction of closing the shutter opening 95.

On the top of the base portion 38, there are formed shafts 43 and 44 and a receiving portion 45. A shutter drive lever 46 of the shutter mechanism, a first coil spring 47 and a frame counter wheel 48 are axially supported on the shaft 43, in the order listed. A second coil spring 49 and a retainer lever 50 are axially supported on the shaft 44 in this order. A cam member 51 or rotating member is inserted in the receiving portion 45. All those parts in combination constitute the exposure unit 16 with the second coil spring 49, the retainer lever 50, the cam member 51, a sprocket wheel 54 and the shutter blade 96.

The receiving portion 45 consists of a through hole communicating downwards. A bottom end of a shaft 53 of the rotating member 51 protrudes from a bottom end of the receiving portion 45. The bottom end of the shaft 53 is engaged with the sprocket wheel 54, which is supported to appear through the wheel slot 33 at the top of the light-shielding tunnel 31 toward the photo film 22. The sprocket wheel 54 is constituted by a wheel portion and two pairs of teeth 54a and 54b protruded therefrom. The small teeth 54b are relatively small. The great teeth 54a are greater. A combination of one of the great teeth 54a and one of the small teeth 54b is positioned in a rotationally symmetrical manner from a combination of the other of the great teeth 54a and the other of the small teeth 54b. Each of the small teeth 54b is meshed with the one of the small perforations 28. Each of the great teeth 54a is meshed with the one of the great perforations 27. The sprocket wheel 54 is caused to make half a rotation in the counterclockwise direction by movement of the photo film 22 toward the cassette shell 21 by one frame.

The cam member 51 is one piece including a two-toothed gear 56, a wind block cam 57, a cocking cam 58, a bias cam 59 and the shaft 53, which are arranged downwards in the order listed. The two-toothed gear 56 is meshed with teeth 48a about the frame counter wheel 48. A top face of the frame counter wheel 48 has a scale with a series of numbers to indicate the number of available unexposed frames. The two-toothed gear 56 rotates the frame counter wheel 48 by one step when the two-toothed gear 56 makes half a rotation. A pair of notches 57a are formed in the periphery of the wind block cam 57 to open in opposite directions. When the wind block cam 57 makes half a rotation, the retainer lever 50 becomes engaged with the notch 57a. The cocking cam 58 consists of a pair of wing-shaped projections directed in opposite directions, and when rotated, pushes the shutter drive lever 46 to cock the shutter mechanism.

The bias cam 59 consists of a pair of projections extending symmetrically in opposite directions, and pushed by a spring 61 mounted on the top of the base portion 38. As the perforations in the photo film 22 are not consecutive one after another, there occurs a phenomenon in which neither of the sprocket teeth 54a and 54b is meshed with the perforations 27 and 28. But the bias cam 59 is pushed by the spring 61 to rotate the sprocket wheel 54 up to a position where one of the small sprocket teeth 54b is engageable with one of the small perforations 28. The spring 61 consists of a flexed thin metal plate.

The shutter drive lever 46 is rotatable between a cocked position disposed in a clockwise direction and a released position disposed in a counterclockwise direction. The first coil spring 47 biases the shutter drive lever 46 toward the released position. The shutter drive lever 46 is one piece including a push receiver 46a, a retainer projection 46b, a knocker end 46c and a spring receiver 46d. The push receiver 46a is pushed by the cocking cam 58 to rotate toward the cocked position. The retainer projection 46b is retained by the retainer lever 50 when in the cocked position. The knocker end 46c, when rotated from the cocked position to the released position, knocks and swings a protruded end 96a of the shutter blade 96, to open/close the shutter opening 95. The spring receiver 46d receives retention of a distal end of the first coil spring 47.

The retainer lever 50 is rotatable between a blocking position and a non-blocking position. The blocking position is located in the clockwise direction, and adapted to blocking movement of the photo film. The non-blocking position is located in the counterclockwise direction, and adapted to releasing movement of the photo film from being blocked. The retainer lever 50 is one piece including a retainer projection 50a, a driven end 50b, an engaging claw 50c and a lock claw 50d. The retainer projection 50a retains the retainer projection 46b of the shutter drive lever 46 in the cocked position. The driven end 50b is pushed toward the non-blocking position in response to depression of the shutter release button 6. The engaging claw 50c is meshed with the periphery of the taking lens 9. The lock claw 50d is engaged with the notch 57a of the wind block cam 57 to lock it.

Figure 6:
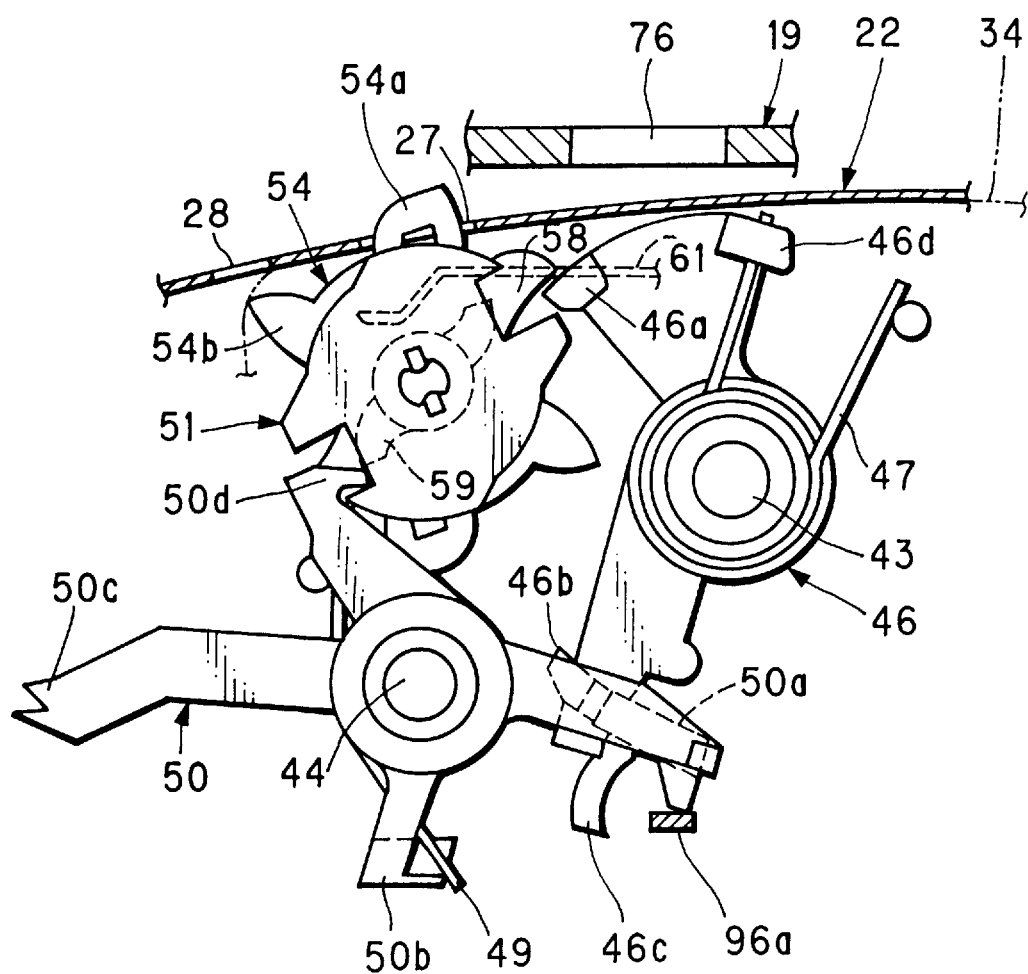
FIG. 6 is a plan illustrating a shutter mechanism in a cocked state.

In FIG. 6, when the shutter mechanism of the exposure unit 16 stands cocked, the lock claw 50d of the retainer lever 50 is engaged with the notch 57a of the wind block cam 57 to block rotation of the wind block cam 57. The retainer projection 50a is engaged with the retainer projection 46b to keep the shutter drive lever 46 in the cocked position. As is not shown, the engaging claw 50c of the retainer lever 50 is meshed with the peripheral teeth of the taking lens 9 to block rotation of the taking lens 9.

When the shutter release button 6 is depressed in the blocked state, the driven end 50b of the retainer lever 50 is pushed in response to it. The retainer lever 50 is rotated toward the non-blocking position in the counterclockwise direction against the bias of the second coil spring 49. In FIG. 7, the shutter drive lever 46 is released from retention of the retainer lever 50, and is rotated toward the released position by the bias of the first coil spring 47, to knock the protruded end 96a of the shutter blade 96. The shutter blade 96 knocked at the protruded end 96a is swung against the return spring 97 to open the shutter opening 95, and then swung back by the return spring 97 to close the shutter opening 95. The retainer lever 50 is retained in the non-blocking position by the shutter drive lever 46 which has rotated to the released position.

When the winder wheel 12 is rotated, the photo film 22 is moved in the arrow direction, to rotate the sprocket wheel 54 and the cam member 51 in the counterclockwise direction in mesh with the one great perforation 27. During the rotation, there occurs a section where the sprocket wheel 54 is not meshed with the photo film 22. However the spring 61 operates in the section to push the bias cam 59 to rotate the sprocket wheel 54. Accordingly the sprocket wheel 54 comes in mesh with succeeding ones of the perforations 27 and 28.

A top plate 63 is mounted on a top of the base portion 38. The top plate 63 has a hole 63a, which supports a top end of the shaft 43. There is a recess 63b, which supports a top end of the cam member 51. The entirety of the top plate 63 is formed from transparent plastic material. A reference numeral 64 designates a lens, which enlarges an image of the scale arranged on the top of the frame counter wheel 48.

The flash device 17 includes a printed circuit board 66, the flash emitter window 11, a switch segment 68 and a synchro switch 69. The printed circuit board 66 has electric parts such as a main capacitor, and constitutes a flash circuit. The flash emitter window 11 is fitted on the printed circuit board 66, appears through the front cover 18, includes a flash discharge tube and a diffuser plate, and emits flash light. The switch segment 68 is disposed behind the flash charge button 10 and depressible. The synchro switch 69 is turned on in response to a releasing operation of the shutter mechanism. A dry battery 67 is mounted on the flash device 17 as a power source for the flash circuit.

When the flash charge button 10 is depressed, the switch segment 68 pushed by it contacts the printed circuit board 66, to start a charging operation of the flash device 17. When the shutter release button 6 is depressed, the shutter mechanism incorporated in the exposure unit 16 is released. The shutter blade 96 being swung turns on the synchro switch 69. Thus flash light is emitted from the flash emitter window 11 to a photographic subject.

The front cover 18 is removably mounted on the front of the photo film containing unit 15. The shutter release button 6 is disposed on the top of the front cover 18, and defined by the inside of three slits formed through the shutter release button 6 and connected in a channel shape. The shutter release button 6 is depressible with resiliency. Under the shutter release button 6 is formed a push arm 71, which, when the shutter release button 6 is depressed, pushes the driven end 50b of the retainer lever 50 of the exposure unit 16 toward the non-blocking position.

The rear cover 19 is secured to the rear of the photo film containing unit 15, and keeps ambient light from entry to the inside of the photo film containing unit 15. There are bottom lids 73 and 74 formed integrally with the rear cover 19 for closing the bottoms of the chambers 35 and 36 light-tightly. There are thin hinging portions being flexible and connecting the bottom lids 73 and 74 to the rear cover 19. The bottom lid 73 is opened for removing the photo film cassette 14 from the lens-fitted photo film unit 2 after use for taking photographs. An inside of the rear cover 19 has a photo film support surface 19a, which is confronted with the exposure aperture and photo film rails.

Figure 8:
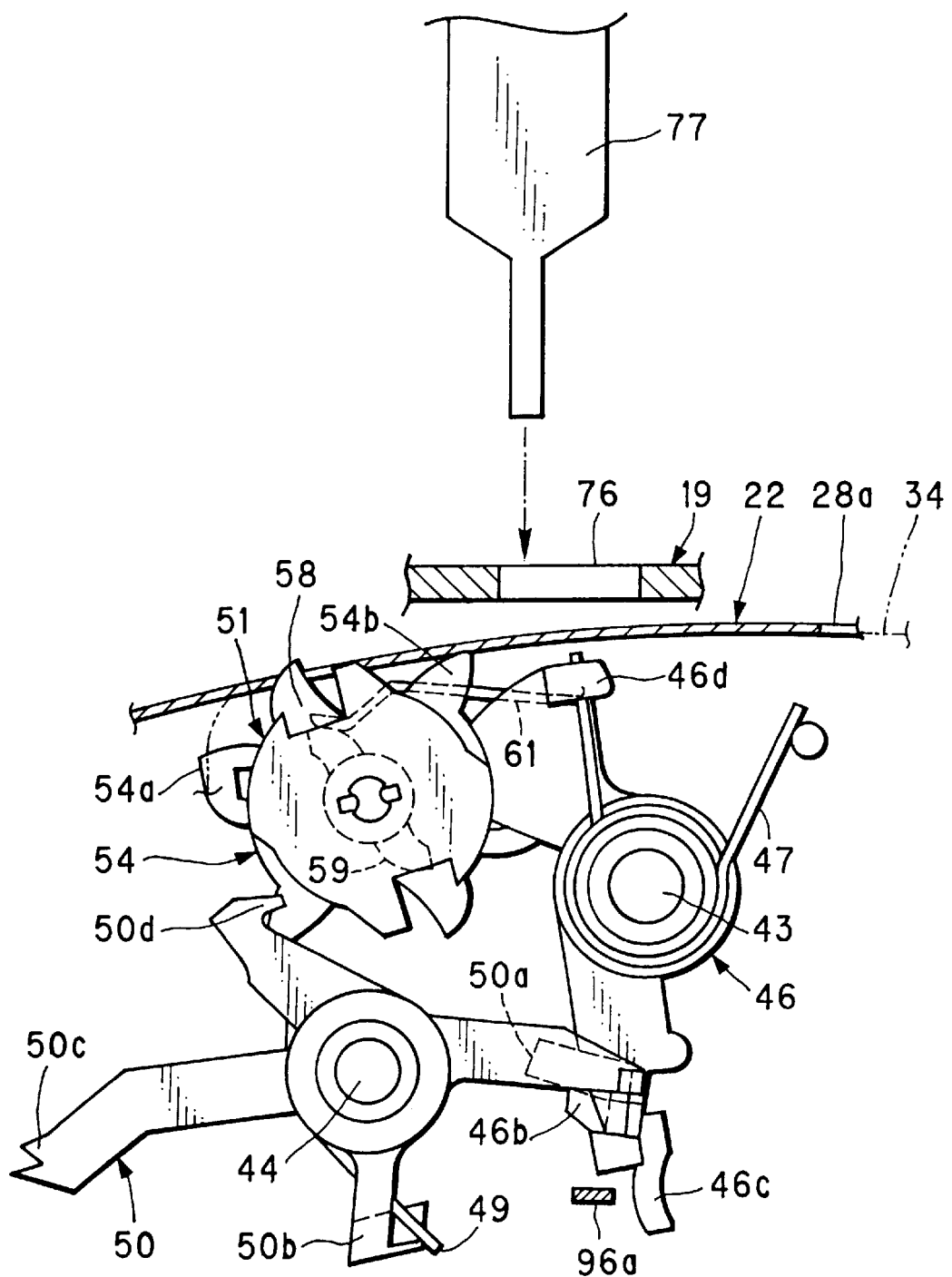
FIG. 8 is a plan illustrating a state of the shutter mechanism during operation of assembly.

There is a cocking slot 76 formed in the rear cover 19 and adapted to cock the shutter mechanism of the exposure unit 16 externally in a forcible manner. In FIG. 8, a portion of the shutter drive lever 46 of the exposure unit 16 appears through the cocking slot 76.

Figure 9:
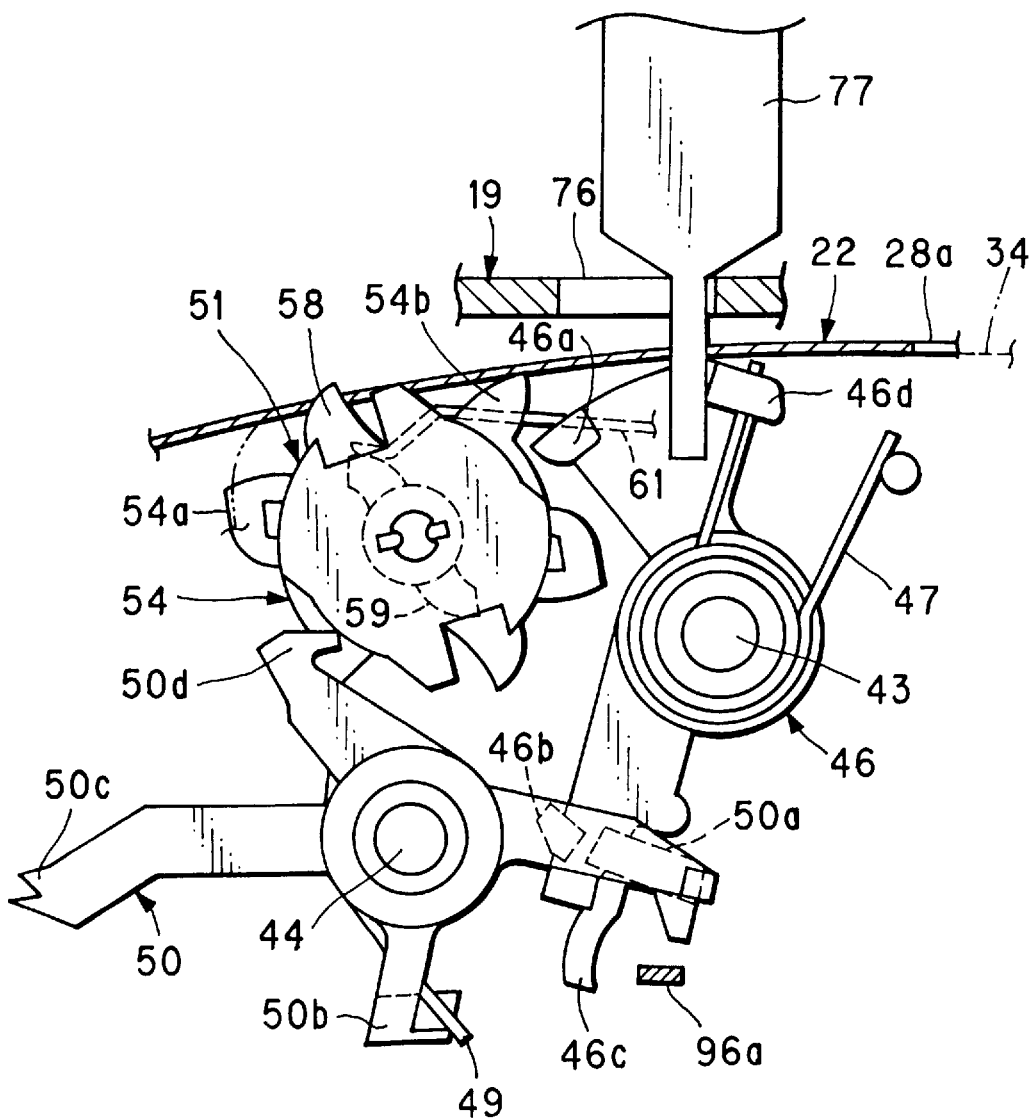
FIG. 9 is a plan illustrating a forcibly cocked state of the shutter mechanism.

When the shutter mechanism does not stand cocked, a stick-shaped jig or tool 77 as a cocking operating unit is externally inserted through the cocking slot 76 to access the retainer projection 46b of the shutter drive lever 46. In FIG. 9, the shutter drive lever 46 is rotated against the first coil spring 47 toward the cocked position in the clockwise direction. Then the retainer lever 50 kept in the non-blocking position by contact of the shutter drive lever 46 is caused by the second coil spring 49 to rotate toward the blocking position in the clockwise direction. Thus the retainer projection 50a of the retainer lever 50 enters a rotational path of the retainer projection 46b of the shutter drive lever 46, to cause the retainer lever 50 to retain the shutter drive lever 46 in the cocked position. It is possible to cock the shutter mechanism without winding the photo film 22.

There is a shutter rotating mechanism, disposed between the top of the cassette containing chamber 35 to extend between the cassette containing chamber 35 and the light-shielding tunnel 31, for rotating the cassette shutter rod 25 of the cassette shell 21 to close it in response to an opening movement of the bottom lid 73. The shutter rotating mechanism is for example the same as that incorporated in the commercially sold model of the lens-fitted photo film unit 2 named "Fujicolor Quicksnap Super Slim" (trade name, manufactured by Fuji Photo Film Co., Ltd.).

The lens-fitted photo film unit 2 is shipped with the shutter mechanism in the state of FIG. 8. The user, after purchasing the lens-fitted photo film unit 2, initially effects a pre-winding operation for the purpose of the shutter cocking. When the photo film 22 is moved in the arrow direction, the small perforation 28a moves to a position confronted with a succeeding one of the small sprocket teeth 54b of the sprocket wheel 54. Then the succeeding small sprocket tooth 54b is meshed with the small perforation 28a by the bias of the spring 61. Operations of the shutter cocking, blocking of winding the photo film, and the frame counting are effected by the mesh of the photo film 22 and the sprocket wheel 54 and cooperation of the spring 61 and the bias cam 59.

Figure 10:
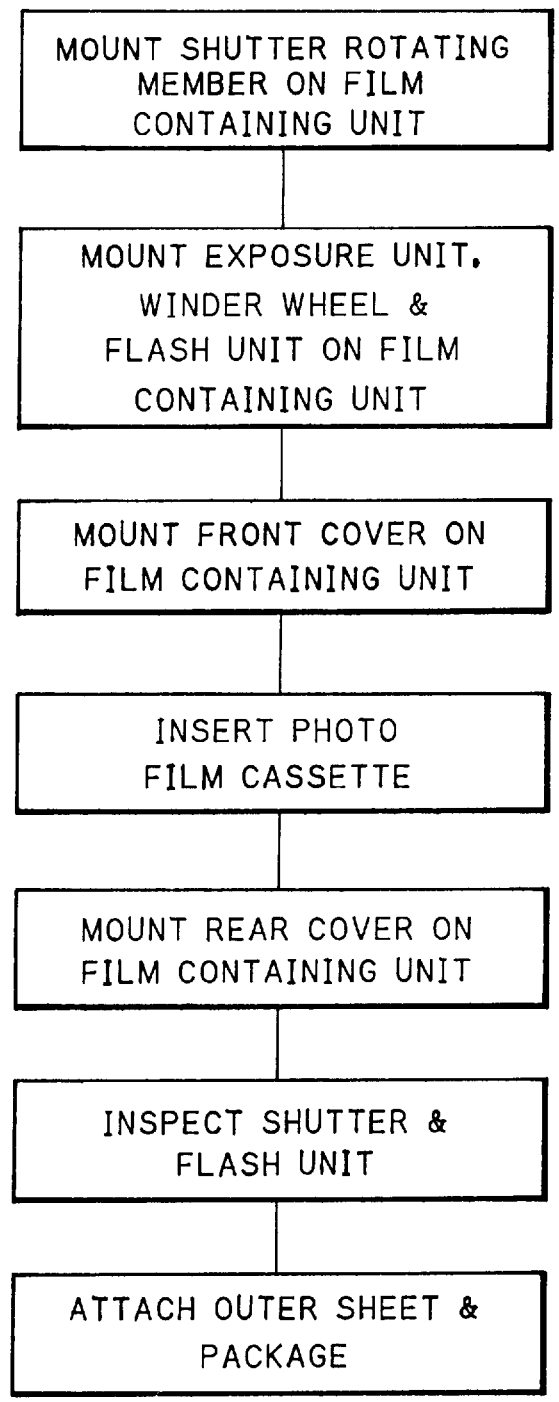
FIG. 10 is a flow chart illustrating a process of manufacturing the lens-fitted photo film unit.

The lens-fitted photo film unit 2 is produced according to a flow illustrated in FIG. 10. A manufacture line for the lens-fitted photo film unit 2 includes an indexing circular table, on which the photo film containing unit 15 is placed and which rotates intermittently. A plurality of assembly stations are disposed on the periphery of the indexing table. When the indexing table is stopped with reference to the assembly stations, each of the parts are secured to the photo film containing unit 15, until the lens-fitted photo film unit 2 is produced.

In a first station defined in an initial position on the periphery of the indexing table, a pallet is supplied with the photo film containing unit 15 of which a front is directed upwards. In a second station of the indexing table, the shutter rotating mechanism is mounted on the set position of the top and the side of the cassette containing chamber 35.

In a third station, the exposure unit 16 is mounted on the front of the light-shielding tunnel 31 of the photo film containing unit 15. The winder wheel 12 is mounted on the top of the cassette containing chamber 35. Furthermore the flash device 17 is mounted on the front of the roll containing chamber 36. The battery 67 is also set on it.

In a fourth station, the front cover 18 is mounted on the front of the photo film containing unit 15. A fifth station is disposed in a dark room, and adapted to changing orientation of the photo film containing unit 15 to direct its front downwards. The photo film cassette 14 is inserted into the rear, inclusive of the cassette shell 21 and the photo film 22 in a roll form. In a sixth station, the rear cover 19 is secured to the rear of the photo film containing unit 15. Then the bottom lids 73 and 74 are closed, before completing the housing 3.

The shutter mechanism shortly after assembling the housing 3 stands uncocked, namely has the shutter drive lever 46 disengaged from the retainer lever 50 as illustrated in FIG. 8. The sprocket wheel 54 is set in a state where the one small sprocket tooth 54b is protruded from the level of the photo film rails 34. The photo film 22 is loaded in the photo film containing unit 15 to confront the leader 22a with the exposure aperture. The one small sprocket tooth 54b of the sprocket wheel 54 is pushed by the photo film 22 and rotationally directed in reverse to the winding direction and against the spring 61. The one small sprocket tooth 54b is contacting the photo film 22 inside the photo film rails 34.

The lens-fitted photo film unit 2 is shipped with the shutter mechanism in the above-described state.

Figure 11:
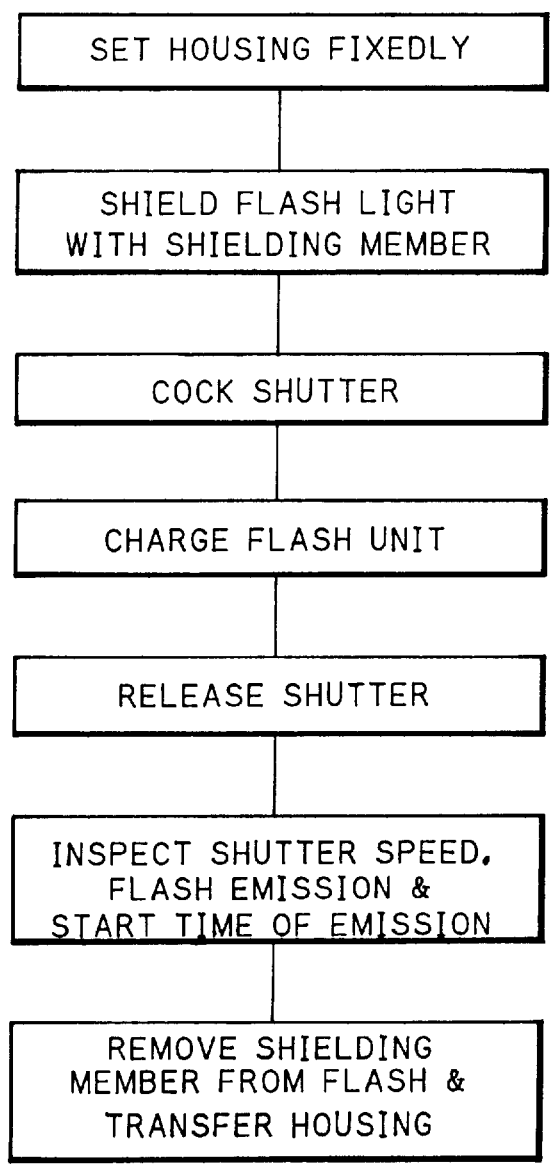
FIG. 11 is a flow chart illustrating steps of inspecting the shutter mechanism and the flash device.

The housing 3 after being completed is transferred to a seventh station by rotation of the indexing table. The seventh station is disposed in the darkroom, and adapted to inspection of the flash device 17 and the shutter mechanism incorporated in the exposure unit 16 in accordance with the flow depicted in FIG. 11.

Figure 12:
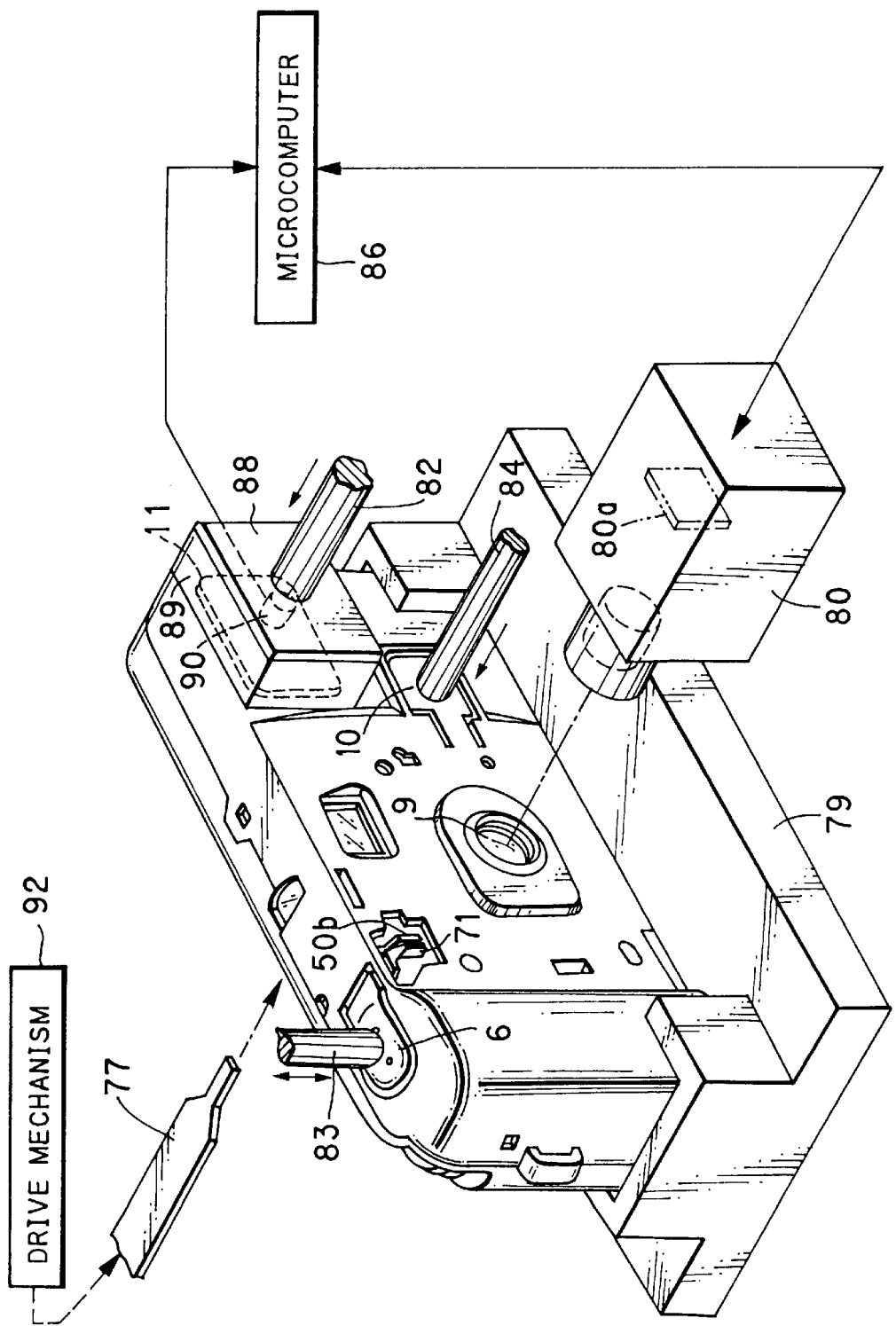
FIG. 12 is a perspective illustrating the lens-fitted photo film unit and an inspecting apparatus for the same.

In FIG. 12, the housing 3 is positioned on a pallet 79 after adjustment of orientation for erection. In front of the taking lens 9 is positioned is a blade sensor 80, being a photo sensor for detecting a release operation of the shutter mechanism. A flash detector 82 is positioned in front of the flash emitter window 11 with a light-shielding structure. A plunger 83 as a release operating unit is positioned on the top of the shutter release button 6, and included in a solenoid for a moving structure. A plunger 84 as a flash operating unit is positioned in front of the flash charge button 10, and included in a solenoid for a moving structure. The stick-shaped jig 77 is positioned in the rear of the housing 3 for the shutter cocking.

The blade sensor 80, the flash detector 82, the charging solenoid, the releasing solenoid and the stick-shaped jig 77 are controlled by a microcomputer 86. The blade sensor 80 and the flash detector 82 send respective detecting signals to the microcomputer 86.

In FIG. 12A, the flash detector 82 includes a base portion 88, a light-shielding sponge 89 and a flash light sensor 90 being a photo sensor. The base portion 88 is formed from metal or plastics. The light-shielding sponge 89 is formed from opaque material with resiliently compressible characteristic responsive to pressure, such as black sponge, for shielding light. The flash light sensor 90 is incorporated in the light-shielding sponge 89 for detecting flash light. The flash detector 82 is movable by means of an air cylinder, a cam mechanism and the like. During the flash inspection, the light-shielding sponge 89 is pressed against the flash emitter window 11 and is deformed to cover the flash emitter window 11 to prevent flash light from exiting from the periphery of the flash emitter window 11. The flash light sensor 90, when detecting flash light, sends a detecting signal to the microcomputer 86.

The blade sensor 80 includes a beam projector and a beam receiver. The beam projector projects a spot-shaped beam of infrared light to the taking lens 9 along the optical axis of the taking lens 9 in a range below exposing the photo film 22. The beam receiver detects the infrared beam reflected by the shutter blade 96. The blade sensor 80, upon detecting the reflected infrared beam from the shutter blade 96, sends a detecting signal to the microcomputer 86.

In FIG. 8, the stick-shaped jig 77 is driven by a drive mechanism 92 of the clocking operating unit under a control of the microcomputer 86, is inserted into the cocking slot 76 in the rear cover 19, and contacts the spring receiver 46d of the shutter drive lever 46. The drive mechanism 92 further slides the stick-shaped jig 77 to rotate the cocking slot 76 toward the cocked position.

In FIG. 9, the shutter drive lever 46 is rotated toward the cocked position in the clockwise direction. The retainer lever 50, which is kept in the non-blocking position by the contact of the shutter drive lever 46, is caused by the second coil spring 49 to rotate toward the blocking position in the clockwise direction. Rotation of the retainer lever 50 causes the retainer projection 50a to enter the rotational path of the retainer projection 46b of the shutter drive lever 46, so that the retainer lever 50 retains the shutter drive lever 46 in the cocked position. The shutter mechanism is forcibly cocked. Then the drive mechanism 92 retracts the stick-shaped jig 77 from the cocking slot 76.

When the shutter cocking is finished with the stick-shaped jig 77, the microcomputer 86 drives the flash charging solenoid to protrude the plunger 84 in the arrow direction, to depress the flash charge button 10. The switch segment 68 behind the flash charge button 10 contacts the printed circuit board 66, so that a charging operation of the flash device 17 is started. The flash device 17 incorporated in the housing 3 of the present embodiment is so structured that the charging operation is started in response to one-time depression of the flash charge button 10 in a short time. It is unnecessary to keep the flash charge button 10 depressed until the finish of the charging operation. The solenoid is driven only for a short time and stops from being driven before long.

After a lapse of a predetermined duration defined for the flash charging, the microcomputer 86 drives the releasing solenoid to protrude the plunger 83 to depress the shutter release button 6. The push arm 71 formed with the shutter release button 6 pushes the driven end 50b of the retainer lever 50 to rotate the retainer lever 50 toward the non-blocking position. The shutter drive lever 46 disengaged from the retainer lever 50 is rotated toward the released position by the bias of the first coil spring 47. During the rotation the knocker end 46c knocks the protruded end 96a of the shutter blade 96. The shutter blade 96 is swung to open the light path from the taking lens 9 to the photo film 22. The shutter blade 96 turns on the synchro switch 69 of the flash device 17, to cause the flash emitter window 11 to emit flash light.

The blade sensor 80 applies an infrared beam to the taking lens 9 in a spotted manner at the same time as driving the charging solenoid. The blade sensor 80 detects the shutter blade 96 in a state prior to the shutter releasing operation, and sends a detecting signal to the microcomputer 86. Again the blade sensor 80 detects the shutter blade 96 in a state following the shutter releasing operation, and sends a detecting signal to the microcomputer 86.

The flash light sensor 90 of the flash detector 82 detects the flash light emitted from the flash emitter window 11, so that the flash detector 82 sends the detecting signal to the microcomputer 86. The flash emitter window 11 is kept covered by the light-shielding sponge 89 of the flash detector 82. No flash light comes out of the light-shielding sponge 89 or affect the detection at the blade sensor 80, or exposes the photo film 22.

As depicted in FIG. 13, the microcomputer 86 measures a shutter speed or shutter-open time T1, which is defined to lapse between the detecting signal received upon the beginning of the shutter release from the blade sensor 80 and that received upon the finish of the shutter release. Also the microcomputer 86 confirms existence of emitted flash light from the flash emitter window 11. Furthermore the microcomputer 86 measures an elapsed time T2 defined to lapse between the beginning of the shutter release and the beginning of the flash emission. The microcomputer 86 evaluates the times T1 and T2 with reference to respective tolerable ranges by effecting an operation of comparison, to check acceptability of the housing 3. If the housing 3 is detected unacceptable, information of identifying the housing 3 is stored in a memory.

For this operation, functions of the microcomputer 86 are schematically depicted in FIG. 13A. A first timer 100 incorporated in the microcomputer 86 measures the shutter-open time T1 in response to the signal from the blade sensor 80. A first evaluator 102 evaluates the shutter-open time T1 with reference to a first predetermined range. If the shutter-open time T1 is detected within the first predetermined range, the shutter mechanism is regarded as acceptable. A second timer 104 measures the elapsed time T2 in response to the signal from the blade sensor 80 and the signal from the flash light sensor 90. A second evaluator 106 evaluates the elapsed time T2 with reference to a second predetermined range. If the elapsed time T2 is detected within the second predetermined range, the flash device 17 is regarded as acceptable.

When the inspection of the shutter mechanism and the flash device 17 is finished, the microcomputer 86 moves the blade sensor 80, the flash detector 82, the charging solenoid, the releasing solenoid and the stick-shaped jig 77 away from the housing 3.

The housing 3 after the inspection in the seventh station is transferred to an eighth station by rotation of the indexing table. The housing 3 being unacceptable is removed from the indexing table during the transfer from the seventh station. The housing 3 is disassembled into parts, and reused as a component or recycled as a regenerated material. In the eighth station, the outer sheet member 4 is attached to the outside of the housing 3, packaged in a packaging, and shipped.

In the above embodiment, the lens-fitted photo film unit is for use with the photo film cassette of the IX240 type. Alternatively a lens-fitted photo film unit may contain a 35 mm type of the photo film cassette. To shield flash light, the light-shielding sponge 89 is used. The light-shielding sponge 89 may be a member formed from any material with a light-shielding characteristic, for example rubber, plastics, or light-trapping fabric called plush; to contact the front face of the flash emitter window 11 without permeation of flash light.

In the above embodiment, the front of the flash emitter window 11 is shielded. Alternatively, a wall-shaped shielding member may be fitted on the outside of the lens-fitted photo film unit 2 along a line between the taking lens and the flash emitter window 11. Furthermore, the front of the taking lens may be shielded from the outside by a member, which may incorporate the blade sensor 80, without using the light-shielding sponge 89 at the flash emitter window 11.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A method of inspecting a lens-fitted photo film unit, said lens-fitted photo film unit being pre-loaded with unexposed photo film, and including a taking lens, a shutter device disposed between said taking lens and said photo film and cocked in response to a winding operation of said photo film, said shutter device having a shutter blade for opening/closing a photographic light path in response to an external releasing operation, and a flash device, having a flash emitter window, for emitting flash light in response to operation of said shutter device, said inspecting method comprising steps of:

covering a front of said flash emitter window by use of a light-shielding member, said light-shielding member being adapted to trapping flash light emitted from said flash emitter window;

charging said flash device;

cocking said shutter device;

releasing said shutter device while said flash emitter window is covered with said light-shielding member;

inspecting an operation of opening/closing of said shutter device in response to said releasing operation; and inspecting an operation of flash emission of said flash device by use of a flash light sensor, said flash light sensor being disposed inside said light-shielding member.

2. An inspecting method as defined in claim 1, wherein said step of inspecting said shutter device includes steps of:

detecting existence of said shutter blade in said light path by use of a blade sensor through said taking lens, said blade sensor being shielded from said flash light by said light-shielding member; and evaluating acceptability of said opening/closing operation of said shutter device in accordance with a signal from said blade sensor.

3. An inspecting method as defined in claim 2, wherein said step of inspecting said flash device includes a step of evaluating acceptability of said flash emission operation of said flash device in accordance with said signal from said blade sensor and a signal from said flash light sensor.

4. An inspecting method as defined in claim 3, further comprising steps of:

measuring a shutter-open time in response to said signal from said blade sensor, said shutter-open time being defined to begin upon retraction of said shutter blade from said light path and to end upon return of said shutter blade into said light path; and evaluating said shutter-open time with reference to a first predetermined range, and if said shutter-open time is detected within said first predetermined range, said shutter device being regarded as acceptable.

5. An inspecting method as defined in claim 4, further comprising steps of:

measuring an elapsed time in response to said signal from said blade sensor and said signal from said flash light sensor, said elapsed time being defined to begin upon said retraction of said shutter blade from said light path and to end upon said flash emission of said flash device; and evaluating said elapsed time with reference to a second predetermined range, and if said elapsed time is detected within said second predetermined range, said flash device being regarded as acceptable.

6. An apparatus for inspecting a lens-fitted photo film unit, said lens-fitted photo film unit including a housing pre-loaded with unexposed photo film, a taking lens disposed in front of said housing, a shutter release button disposed on a top of said housing, a shutter device operable in response to depression of said shutter button, and a flash device, said shutter device having a shutter blade for opening/closing a photographic light path, said flash device having a flash emitter window and a flash switch, said flash emitter window being disposed in front of said housing, and said flash switch being adapted to flash charging, and said flash emitter window emitting flash light in response to operation of said shutter device, said inspecting apparatus comprising:

a flash operating means for operating said flash switch;

a light-shielding member for covering said flash emitter window;

a shutter operating means for cocking said shutter device by accessing said shutter device through an opening formed behind said housing;

a release operating means for depressing said shutter button while said flash emitter window is covered with said light-shielding member, and with said flash device charged and with said shutter device cocked;

a shutter inspector unit for inspecting said shutter device by detecting an operation of opening/closing of said shutter blade; and a flash inspector unit including a flash light sensor, said flash inspector unit being disposed inside said light-shielding member, for inspecting said flash device by detecting flash light emitted from said flash emitter window.

7. An inspecting apparatus as defined in claim 6, wherein said shutter inspector unit includes a blade sensor for detecting existence of said shutter blade in said light path through said taking lens, said blade sensor being shielded from said flash light by said light-shielding member.

8. An inspecting apparatus as defined in claim 7, wherein said shutter inspector unit includes:

a first timer for measuring a shutter-open time in response to said signal from said blade sensor, said shutter-open time being defined to begin upon retraction of said shutter blade from said light path and to end upon return of said shutter blade into said light path; and a first evaluator for evaluating said shutter-open time with reference to a first predetermined range, and if said shutter-open time is detected within said first predetermined range, said shutter device being regarded as acceptable.

9. An inspecting apparatus as defined in claim 8, wherein said flash inspector unit includes:

a second timer for measuring an elapsed time in response to said signal from said blade sensor and a signal from said flash light sensor, said elapsed time being defined to begin upon said retraction of said shutter blade from said light path and to end upon emission of said flash light from said flash emitter window; and a second evaluator for evaluating said elapsed time with reference to a second predetermined range, and if said elapsed time is detected within said second predetermined range, said flash device being regarded as acceptable.

* * * * *